Figure 1:
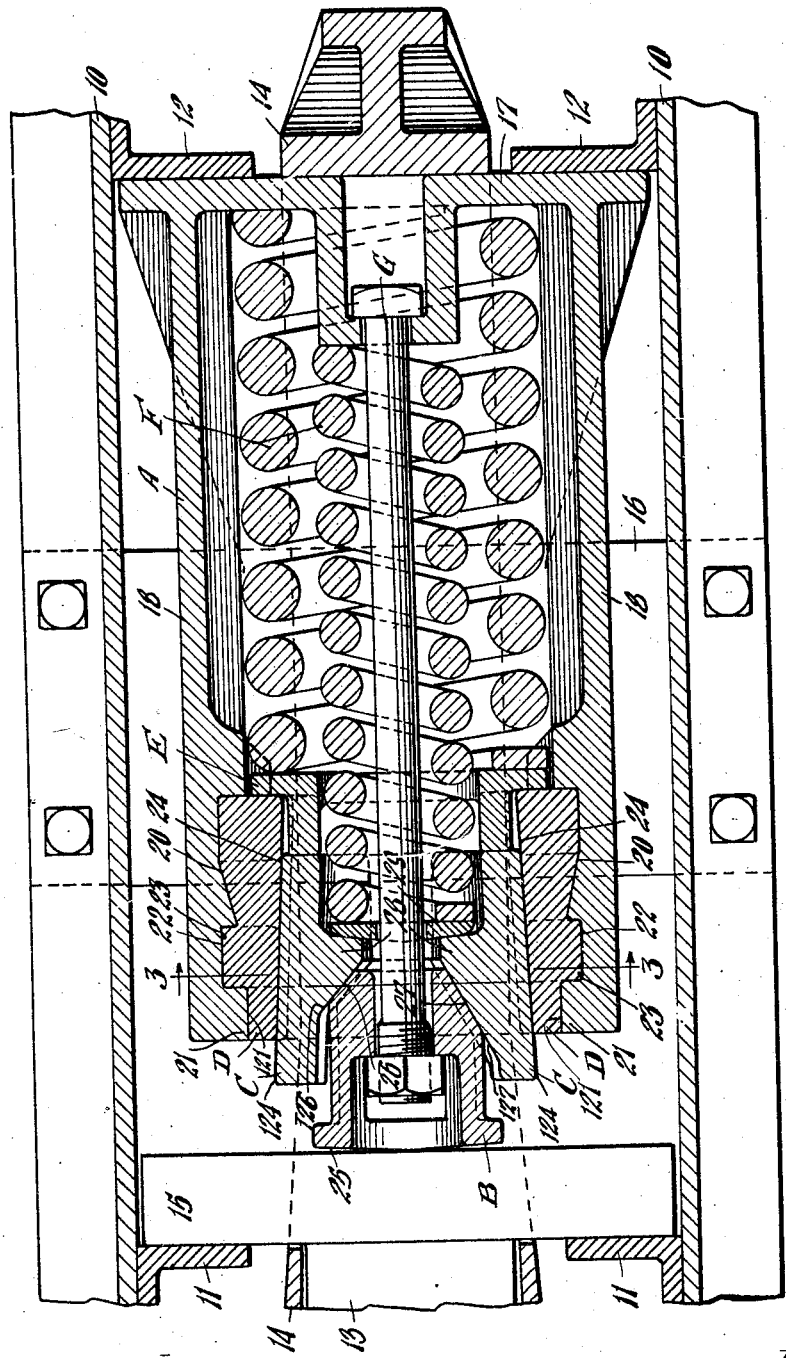

Nov. 20, 1928.  H. J. LOUNSBURY  1,692,273
FRICTION SHOCK ABSORBING MECHANISM
Filed Dec. 18, 1926   2 Sheets-Sheet 2
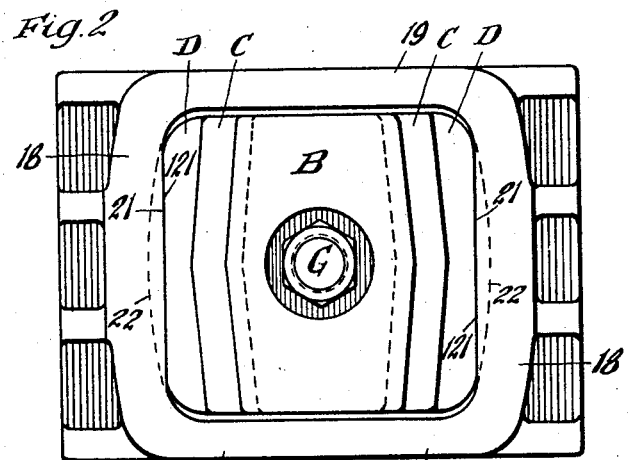
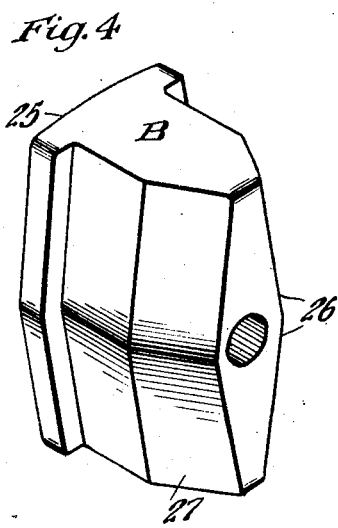
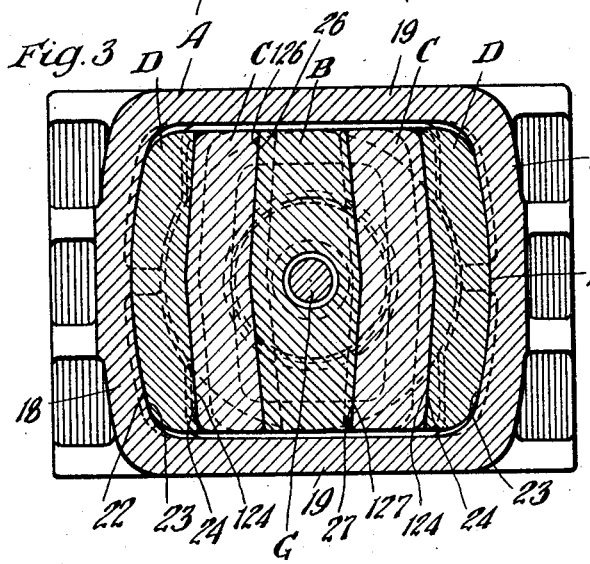
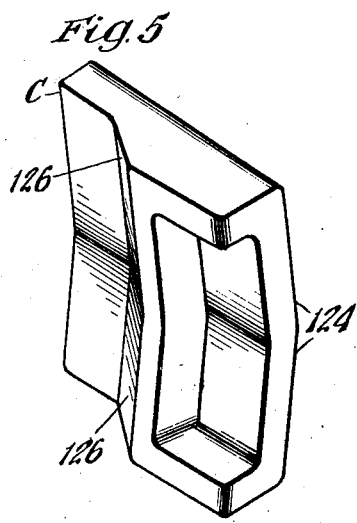
Witness
Wm. Geiger
Inventor
Harvey J. Lounsbury
By George J. Haight
His Atty.

Patented Nov. 20, 1928.

1,692,273

UNITED STATES PATENT OFFICE.

HARVEY J. LOUNSBURY, OF GLEN ELLYN, ILLINOIS, ASSIGNOR TO W. H. MINER, INC., OF CHICAGO, ILLINOIS, A CORPORATION OF DELAWARE.

FRICTION SHOCK-ABSORBING MECHANISM.

Application filed December 18, 1926. Serial No. 155,573.

This invention relates to improvements in friction shock absorbing mechanisms.

One object of the invention is to provide a friction shock absorbing mechanism especially adapted for railway draft riggings, including a column element and a friction system co-operating therewith, wherein provision is made to maintain the elements of the friction system centered to limit the engagement of the parts to the active friction surfaces and prevent wear of the non-active surfaces of the mechanism.

Another object of the invention is to provide a friction shock absorbing mechanism of the character indicated, including a friction shell having opposed friction surfaces with which co-operate a friction system including friction shoes and a wedge member, wherein means is provided for confining the shoes and wedge member to relative longitudinal movement only, thereby preventing displacement of the parts and eliminating wear and scoring of the friction shell.

A more specific object of the invention is to provide a friction shock absorbing mechanism including a rectangular shell having opposed friction surfaces associated with two of the opposed walls thereof, a friction system including friction shoes and a wedge member co-operating therewith, wherein provision is made for holding the wedge member and shoes centered with reference to the friction surfaces to maintain the same spaced from the remaining walls of the shell, thereby eliminating wear of the latter.

A still further object of the invention is to provide a friction shock absorbing mechanism, including a rectangular shell provided with detachable liners presenting opposed interior friction surfaces, a friction system co-operating with the liners, including friction shoes and a wedge member, wherein the wedge, friction shoes, liners and walls with which the liners co-operate are so designed as to prevent relative vertical displacement of the parts.

Other and further objects and advantages of the invention will more fully and clearly appear from the description and claims hereinafter following.

In the drawings, forming a part of this specification, Figure 1 is a horizontal, longitudinal, sectional view of a railway draft rigging, showing my improvements in connection therewith. Figure 2 is a front end elevational view of the shock absorbing mechanism proper. Figure 3 is a transverse, vertical, sectional view corresponding substantially to the line 3—3 of Figure 1. And Figures 4 and 5 are detailed, perspective views respectively of the wedge member and a friction shoe of my improved mechanism.

In said drawings, 10—10 indicate channel-shaped center or draft sills of a railway car underframe, to the inner surfaces of which are secured the usual front stop lugs 11—11 and rear stop lugs 12—12. The inner end portion of the drawbar is designated by 13 to which is operatively connected a yoke 14 of usual form. The shock absorbing mechanism proper as well as a front main follower 15 is disposed within the yoke, and the yoke and the parts supported therein are maintained in operative position by a detachable saddle plate 16 fixed to the draft sills.

My improved shock absorbing mechanism proper comprises broadly: a spring cage A; a wedge block B; two friction shoes C—C; two liners D—D; a spring follower E; a main spring resistance F; and a retainer bolt G.

The spring cage A is of substantially rectangular box-like form and has a transverse vertically disposed rear end wall 17, longitudinally disposed vertical side walls 18—18 and horizontally disposed, longitudinally extending top and bottom walls 19—19. The end wall 17 is extended laterally beyond the side walls 18 as most clearly shown in Figure 1, and the cage is braced by longitudinal webs formed integral with the end wall and side walls. The end wall 17 co-operates with the rear stop lugs 12 in the manner of the usual rear follower. The side walls 18—18 are thickened at the forward end of the cage and are interiorly cut away as indicated at 20 in Figures 1 and 3, thereby leaving inwardly extending flanges or ribs 21—21 at the outer end of the cage, having substantially flat vertically disposed inner faces. Rearwardly of the ribs 21, the cut out sections are formed to present grooves 22—22. The walls of the cut out portions 20 and the grooves 22 are curved as most clearly shown in Figure 3. The liners D which are two in number, are of like construction, each being in the form of a relatively heavy plate having a flat abutment face 121 at the forward end thereof adapted to co-operate with the rib 21 of the cage, and having a curved abutment face 23 rearwardly of the face 121 corresponding in outline to the groove 22 and cut away portion 20 of the corresponding side wall 18 of the cage. It will thus be seen that each liner when assembled with the cage, is held against longitudinal movement by the rib 21 and groove 22 with which the corresponding parts of the liner co-operate and is maintained in central position on the side wall of the cage by the co-operating curved interengaging surfaces on the liner and the cage. On the inner side, each liner is provided with a longitudinally disposed friction surface 24 of V-shape, as most clearly shown in Figures 2 and 3. The V-shaped friction surfaces 24 are preferably converged inwardly of the mechanism as most clearly shown in Figure 1. The inner ends of the liners protrude beyond the corresponding side walls of the cage so as to present transverse abutment surfaces which co-operate with the spring follower E to limit the outward movement of the latter. The wedge G is in the form of a relatively heavy block having a slightly convex cylindrical end face 25 which bears on the inner side of the main follower 15. At the inner end, the wedge block 13 is provided with a pair of inwardly converging wedge faces 26 and 27, the wedge face 27 being disposed at a relatively keen wedge acting angle with respect to the longitudinal axis of the mechanism and the wedge face 26 being disposed at a relatively blunt releasing angle with reference to said axis. Although these two wedge faces are shown as disposed at different angles in the disclosure of this invention, it will be evident that the same may be disposed at the same angle with reference to the axis of the mechanism. As most clearly shown in Figure 4, each of the wedge faces 26 and 27 are of V-shape for a purpose hereinafter described.

The friction shoes C—C which are two in number, are disposed at opposite sides of the mechanism and are interposed between the wedge and the liners D. Each of the friction shoes C has a longitudinally disposed outer friction surface 124 which is of V-shape to correspond with the V-shaped friction surface of the liner at the same side of the mechanism. On the inner side, each of the shoes C is provided with a lateral enlargement 28 having a wedge face on the forward side thereof, the wedge face of the shoe co-operating with the wedge face 26 of the wedge block, being designated by 126 and correspondingly inclined to the face 26, and the wedge face of the other shoe being designated by 127 and co-operating with the wedge face 27 of the block and correspondingly inclined thereto. The wedge face of both of the shoes are V-shaped to correspond with the V-shape of the wedge face of the block B as most clearly shown in Figures 2, 3 and 5. As clearly shown in Figures 2 and 3, the wedge block B, friction shoes C and the liners D—D are of lesser height than the interior of the cage, clearance being thus left between the top and bottom of these parts and the top and bottom walls 19 of the cage. Due to the fact that the wedge, shoes and liners have interengaging V-shaped faces and surfaces, these parts are maintained against relative vertical movement, thereby preventing accidental engagement thereof with the top and bottom walls of the cage. By this arrangement, the wedge block, shoes and liners are always held in spaced relation to the top and bottom walls of the cage and wear of the latter is entirely prevented.

The spring follower E is in the form of a heavy flanged ring having the flange thereof bearing on the inner ends of the liners D, thereby limiting the outward movement of the spring follower. The outer end of the ring section of the spring follower bears on the inner ends of the shoes C.

The main spring resistance F comprises a relatively light inner coil and a relatively heavier outer coil. The inner coil has its opposite ends bearing on an inwardly projecting hollow boss on the rear wall 17 of the cage and a disk-like spring follower 29 bearing on the inner ends of the enlargements 28 of the shoes. The outer coil of the spring resistance has its opposite ends bearing respectively on the end wall 17 of the cage and the flange of the spring follower E.

The mechanism is maintained assembled and of uniform overall length by the retainer bolt G which has the head thereof anchored to the hollow boss of the end wall 17 of the spring cage, and the nut thereof anchored to the wedge block B. In addition to holding the parts assembled, the retainer bolt also maintains the spring resistance element E under initial compression.

Due to the initial compression under which the main spring is held, the wedge, friction shoes and liners will always be maintained under lateral pressure and held in centered position. Compensation for wear of the various friction and wedge faces is also provided by expansion of the spring resistance means which as hereinbefore stated is under initial compression.

The operation of my improved shock absorbing mechanism, assuming a compression stroke, is as follows: The follower 15 and the cage A will be moved relatively toward each other, thereby causing the wedge block B to be carried inwardly of the cage, setting up a wedging action between the block and the friction shoes C and also carrying the shoes inwardly of the spring cage along the friction surfaces of the liners D, compressing the main spring resistance means F. Inasmuch as the interengaging wedge faces of the wedge and friction shoes are of V-shape and the inter-engaging friction surfaces of the shoes and the liners are also V-shaped, the parts will be confined to longitudinal movement, thereby preventing engagement of the top and bottom sides of the shoes and wedge with the top and bottom walls of the cage and eliminating wear of these parts. In this connection, it is pointed out that in friction gears of this type, wherein flat inter-engaging friction and wedge faces are provided, there is a tendency for the parts to be displaced vertically so as to engage either the top or bottom walls of the cage and cause incessant wear thereof, soon damaging the cage to such an extent that the same becomes useless. By the present arrangement, this is entirely avoided. It should also be noted that due to the convex surfaces on the liners, which co-operate with the concave surfaces of the side walls of the cage, the liners are also centered, thereby maintaining all of the parts in proper position with reference to the top and bottom walls of the cage to preserve the proper clearance between these parts. When the gear is fully compressed, the follower 15 will engage the outer end of the cage A, thereby limiting relative movement of the parts, the pressure being then transmitted directly through the cage which acts as a column load transmitting member and prevents the springs from being unduly compressed.

When the actuating pressure is reduced, the spring F will return all of the parts to normal position, outward movement of the spring follower being limited by engagement with the inner ends of the liners and outward movement of the wedge being limited by the retainer bolt, the friction shoes in turn being limited in their outward movement by the wedge.

During the operation of my improved gear, proper full face contact between the co-operating wedge faces and cooperating friction surfaces is assured by the provision of the cylindrical end face on the wedge, irrespective of the angular positions assumed by the cooperating main follower. In other words, inasmuch as the main follower is free to rock on the wedge block, the relative position of the wedge block with respect to the other parts of the mechanism, and especially the friction shoes, is not altered by angular displacement of the main follower. The angular displacement of the wedge block by rocking of the main follower, with resultant tilting of the wedge on the wedge faces of the shoes, thus effecting line contact instead of full face contact between these parts, is a common defect in the usual two shoe type of friction gear, wherein the wedge has flat face contact with the main follower. It will be evident that my improved construction entirely overcomes this defect.

By the employment of the blunt and keen wedge faces on the wedge block and friction shoes, a relatively high wedging action is produced during compression of the parts, due to the keen wedge faces, and release of the mechanism will be assured through the blunt wedge faces. In this connection, it will be understood that my improvements are capable of use in connection with mechanisms employing either the blunt and keen angle system of wedge faces, or wedge faces which are of the same angle with respect to the axis of the mechanism.

While I have herein shown and described what I now consider the preferred manner of carrying out my invention, the same is merely illustrative, and I contemplate all changes and modifications that come within the scope of the claims appended hereto.

I claim:

1. In a friction shock absorbing mechanism, the combination with a spring cage having a plurality of side walls, two of said side walls being opposed; of a spring resistance within the cage; a pair of detachable liners; means for preventing relative longitudinal movement of said liners and cage, said liners and side walls of the cage having interengaging faces thereon for holding the liners centered on said walls; a pair of friction shoes co-operating with the liners; a wedge block engaging the shoes, said wedge block, shoes and liners being provided with inter-engaging means for holding all of said parts centered on said side walls and uniformly spaced from the remaining walls respectively.

2. In a friction shock absorbing mechanism, the combination with a rectangular friction shell having top, bottom and side walls, said side walls being provided with detachable liners presenting opposed interior friction surfaces, said side walls and liners having inter-engaging surfaces holding the liners against vertical displacement; of a pair of friction shoes having friction surfaces inter-engaged with the friction surfaces of the liners to hold said shoes and liners against relatively vertical displacement and maintain the shoes spaced from the top and bottom walls of the shell; a wedge block co-operating with the shoes, said block and shoes having inter-engaging wedge faces preventing vertical displacement of the wedge and shoes and maintaining the wedge spaced from the top and bottom walls of the shell; and a spring resistance means within the cage.

3. In a friction shock absorbing mechanism, the combination with a spring cage having opposed side walls and top and bottom walls; of a main follower, said main follower and cage being relatively movable toward and away from each other; a wedge block; a pair of friction shoes cooperating with the wedge block; detachable liners anchored to the cage against longitudinal movement, said liners and shoes having cooperating V-shaped friction surfaces and said wedge block and shoes having co-operating V-shaped wedge faces, the inter-engaging faces of the side walls of the cage and liners being formed to hold said liners centered on said side walls; and a main spring resistance opposing inward movement of the friction shoes.

4. In a friction shock absorbing mechanism, the combination with a casing, said casing having opposed walls and being open at one end; of detachable liners secured to said opposed walls of the casing; a pair of shoes co-operating with the liners; a wedge block engaging the shoes; a spring resistance within the cage, said shoes, wedge block and liners being formed with interengaging means to confine the relative movement thereof to a direction longitudinal of the mechanism; a spring follower co-operating with the spring resistance; and an additional spring resistance extending through the spring follower and co-operating with the shoes.

5. In a friction shock absorbing mechanism, the combination with a casing, said casing having opposed walls and being open at one end; of detachable liners secured to two of said opposed side walls and held against longitudinal movement and vertical displacement, said liners presenting interior friction surfaces; a pair of friction shoes spaced from the remaining side walls of the casing, said shoes having friction surfaces interengaging with the friction surfaces of the liners to confine relative movement of said shoes and liners to a direction longitudinal of the mechanism; a wedge block having wedge faces interengaging with similar faces on the shoes to confine relative movement of said wedge block and shoes to a direction longitudinal of the mechanism; a spring resistance; spring follower means interposed between the spring resistance and shoes; and an additional spring resistance extending through the spring follower and opposing movement of the shoes.

In witness that I claim the foregoing I have hereunto subscribed my name this 15th day of December, 1926.

HARVEY J. LOUNSBURY.